United States Patent [19]
Kron

[11] 4,030,207
[45] June 21, 1977

[54] G-SEAT WITH SKIN TENSION CUE GENERATOR

[75] Inventor: Gerald J. Kron, Binghamton, N.Y.

[73] Assignee: The Singer Company, Binghamton, N.Y.

[22] Filed: Dec. 2, 1975

[21] Appl. No.: 636,895

[52] U.S. Cl. .................................. 35/12 E; 35/12 H
[51] Int. Cl.² .......................................... G09B 9/08
[58] Field of Search .............. 35/12 R, 12 A, 12 H, 35/12 B, 12 C, 12 D, 12 E, 12 P, 12 S, 12 N; 272/1 C; 297/201, 284, 312, 423, DIG. 3, DIG. 8, DIG. 10; 128/33

[56] References Cited

UNITED STATES PATENTS

| | | | |
|---|---|---|---|
| 3,043,293 | 7/1962 | Rider | 128/33 |
| 3,097,436 | 7/1963 | Gaucher | 35/12 E |
| 3,158,398 | 11/1964 | Stryker | 297/333 |
| 3,270,440 | 9/1966 | Radosevic | 35/12 E |
| 3,309,795 | 3/1967 | Helmore | 35/12 E |
| 3,479,087 | 11/1969 | Burke | 297/339 |

FOREIGN PATENTS OR APPLICATIONS

| | | | |
|---|---|---|---|
| 1,004,005 | 9/1965 | United Kingdom | 35/12 E |
| 979,495 | 1/1965 | United Kingdom | 35/12 E |

OTHER PUBLICATIONS

"Study to Determine Methods of Simulating Effects, 38 by Christensen and Johnson, Oct. 1958.
"Modeling of the Human Force and Motion Sensing Mechanisms, a Thesis", by Don R. Gum, 1972.

Primary Examiner—Richard C. Pinkham
Assistant Examiner—Vance Y. Hum
Attorney, Agent, or Firm—Jeffrey Rothenberg; James C. Kesterson

[57] ABSTRACT

A G-seat for simulating accelerations is provided with apparatus for generating skin tension/contraction cues. These cues are generated by displacing at least a portion of a body-supporting, seat cushion surface in a direction generally parallel to said surface. Disclosed are various exemplary mechanisms for producing this displacement including apparatus for imparting coplanar movement to either a whole seat cushion, or a section thereof, relative to the remainder of the seat; seat cushion lip extenders; and driveable seat upholstery. The operation of the skin tension cue generator is preferably coordinated with the operation of the other active elements of an Advanced G Seat to produce compatible skeletal attitude, flesh pressure gradient, area of contact and skin tension cues.

29 Claims, 19 Drawing Figures

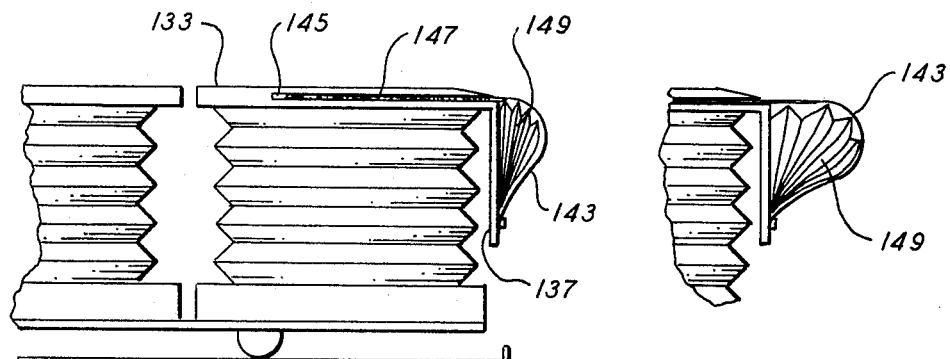
FIG. 5A
FIG. 5B
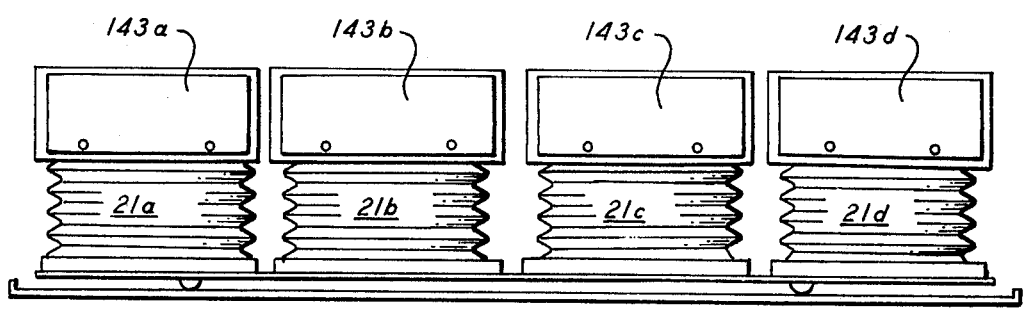
FIG. 5C
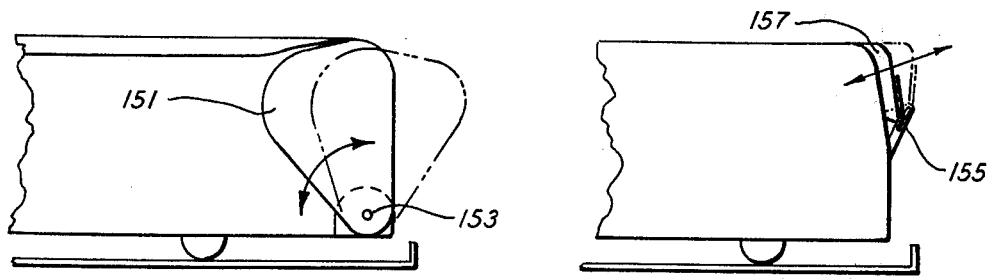
FIG. 6
FIG. 7

G-SEAT WITH SKIN TENSION CUE GENERATOR

BACKGROUND OF THE INVENTION

1. Field of the Invention

The invention relates generally to vehicular motion simulation and, more particularly, to an improved seat for inducing motion sensations similar to those experienced during actual operation of a vehicle. The invention is particularly useful in providing sustained acceleration cues and enhancing motion onset cues in an aircraft simulator.

2. Description of the State of the Art

Although simulators for many different types of vehicles have been constructed, to date the principal efforts have been in the field of aircraft simulation. The instant invention will therefore be described in this context.

In present day aircraft simulators, movement is simulated by mounting a full size replica of a cockpit on a large mechanical motion base. The motion base repositions the cockpit replica according to the equations of motion for the particular aircraft being simulated, thereby providing an occupant with kinesthetic information relating to aircraft attitude, velocity and acceleration. Since changes in acceleration are the most noticeable sensations experienced in an actual operational aircraft, motion bases are generally designed to emphasize these portions of the vehicle motion profile.

Owing to various mechanical constraints, motion bases produce the most useful stimuli, or "cues," during the onset phase of low-level, short-term accelerations. However, as the accelerations become larger in magnitude and longer in duration, the limits of the motion system are approached and cue generation is constrained or terminated. A need, therefore, exists for a mechanism capable of producing sustained acceleration cues.

A number of prior art devices have attempted to induce acceleration sensations by body manipulation. These prior art devices reproduce the body position changes which occur during actual accelerations; however, they fail to provide many of the other important motion cues experienced in an operational vehicle. Suffering from such serious shortcomings as seat cushion ballooning, generation of false and conflicting cues, and deterioration of cockpit realism due to the use of cumbersome extraneous hardware, these earlier devices have proven to be of little practical application.

To overcome the problems associated with these prior art devices, the instant inventor, in conjection with two co-workers, previously devised a revolutionary new seat for simulating aircraft motion. Denominated on Advanced G Seat, this earlier invention successfully produced sustained acceleration cues and also enhanced the motion onset cues provided by a motion base.

As described in commonly assigned, U.S. application Ser. No. 521,457, now U.S. Pat. No. 3,983,640 this Advanced G Seat provides the compatible body excursion, flesh pressure gradient and area of contact cues associated with various acceleration profiles, while maintaining cockpit fidelity. The continuing enthusiastic response of flight simulator users to the Advanced G-Seat, has established it as a major breakthrough in the art.

The instant invention significantly improves upon the Advanced G-Seat by incorporating therein means for selectively and independently varying skin tension. The inventor has found that the sensations of flesh surface tension and contraction felt in epidermal regions proximate the seat cushions, during actual vehicular accelerations, and the accompanying variations in force transferred by the clothes to other areas of the flesh, are important motion cues. In an operational vehicle, these cues result from inertail body movement. The instant invention discloses several ingenius mechanisms to reproduce these acceleration effects in a vehicle simulator.

In the previously devised Advanced G-Seat, "scrubbing" along a subject's back resulted from Z axis body shift and lateral upper torso movement. However, this tactile cue occurred merely as an incidental consequence of other drive techniques, required a variation in skeletal attitude, and was limited to the vicinity of the backrest. In the instant invention, skin tension is treated as a separate Haptic System element which can be driven independently, without a change in body position, to produce appropriate tension variations in the flesh surface proximate the seat pan, as well as the backrest.

SUMMARY OF THE INVENTION

According to the instant invention, a seat for simulating accelerations is provided with means for selectively varying flesh surface tension. Desired skin tension cues are produced by controllably displacing at least a portion of a body-supporting, seat cushion surface in a direction generally parallel to said surface. This displacement causes movement of the contiguous clothing, and of the adjacent section of skin relative to the surrounding skin. Said relative skin movement results in desired skin tensioning in surrounding skin. Simultaneously, appropriate force variations are transferred from the seat cushion surface to other areas of the flesh by the clothing. When employed with the Advanced G-Seat, the instant invention permits coordinated operation of the skin tension cue generator and the other active elements of the seat, to produce compatible Haptic sensory system stimuli (i.e., skeletal attitude, area of contact, flesh pressure gradient and skin tension cues which are all similar to those experienced during an actual acceleration). Generally parallel cushion surface displacement can also be advantageously used to alter the extent of seat contact with sensitive body areas, such as the back-of-the-knee region.

One object of the present invention is to provide an improved G-seat capable of selectively producing flesh surface tension/contraction cues.

Another object of the invention is to provide a method and apparatus for simulating vehicular motion effects by varying skin tension.

Another object is to provide an improved G-seat capable of independently producing variations in pressure gradient, skeletal attitude, extent of flesh contact and flesh surface tension and coordinating same to effectively simulate accelerations.

Still another object is to generate compatible motion cues with a seat of a vehicle simulator by selectively displacing at least a portion of a body-supporting, seat cushion surface in a direction generally parallel to said surface.

Yet another object is to improve the motion simulation provided by the Advanced G-Seat by producing compatible variations of skin tension in epidermal regions proximate the seat cushions, compatible changes in clothes transferred forces in other areas of the flesh, and/or compatible alterations in the extent of flesh/seat contact in the dorsal upper knee and other body areas.

A further object is to provide dynamic body supporting means within an aircraft simulator which looks and feels like a seat in an actual aircraft, maintains cockpit fidelity and provides accurate and realistic kinesthetic sensations without resorting to extraneous hardware.

A still further object is to provide an improved G seat which can be used either along or with a motion system of an aircraft, or other vehicle simulator, to safely, economically and accurately simulate changes in motion.

Other objects and advantages of the invention will, in part, be obvious and will, in part, appear hereinafter.

BRIEF DESCRIPTION OF THE DRAWINGS

These and other features of the present invention will be more clearly understood from a consideration of the following description taken in connection with the accompanying drawings in which:

FIG. 5A is a side view of a second lip extender embodiment;

FIG. 5B is a partial side view of the lip extender of FIG. 5A under simulated thrust conditions;

FIG. 5C is a front view of a seat pan equipped with lip extenders of the type illustrated in FIG. 5A;

FIG. 6 and FIG. 7 are side views of alternative lip extenders;

DETAILED DESCRIPTION

Although the skin tension cue generator of the instant invention can be advantageously incorporated into any seat used for simulating vehicular motion, it is preferably employed in conjunction with the Advanced G-Seat of commonly assigned application Ser. No. 521,457, filed Nov. 6, 1974, in the name of Frank M. Cardullo, William J. Hewitt and Gerald J. Kron Now U.S. Pat. No. 3,983,640.

Figure 1:
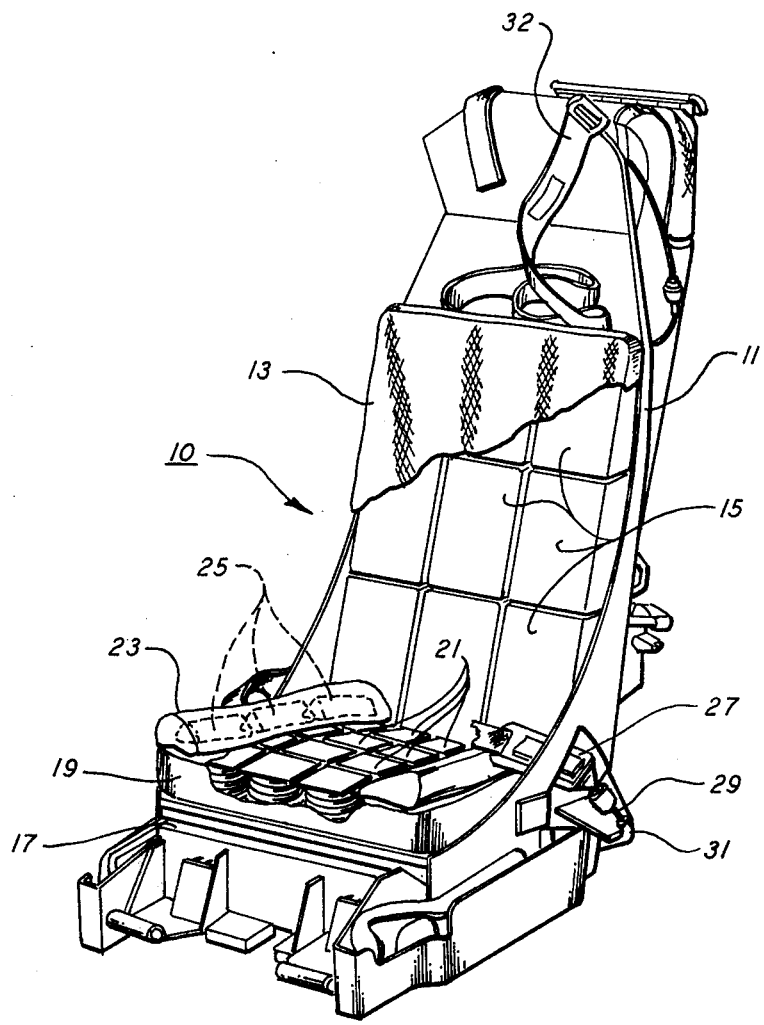
FIG. 1 is a perspective view of the earlier developed Advanced G-Seat.

The general configuration of this earlier developed Advanced G-Seat is depicted in FIG. 1. As illustrated therein, seat 10 includes a frame 11 which supports a mosaic of, for example, nine air cells 15. The air cells 15 are arranged in a three (wide) by three (high) matrix. These cells, enclosed in an upholstered cover 13 having elastic side panels, define the backrest or back-supporting cushion of the seat. A supporting frame 17 supports a seat pan or buttocks-supporting cushion 19. Cushion 19 includes a mosaic of, for example, sixteen air cells 21, arranged in a four (wide) by four (deep) matrix. Cells 21 may also be enclosed within a padded, upholstered cover having elastic side panels. The air cells of both the backrest and seat pan are composed of tension spring-loaded bellows having rigid top plates. The bellows act as pressure sensitive excursion devices translating their rigid top plates in a direction generally perpendicular to the body-supporting surface of the respective cushion.

Located near the side edges of seat cushion 19, are thigh panels 23 for exerting pressure on the outside of a seated subject's thighs. Each thigh panel 23 contains, for example, three clam-sheel shaped air cells 25. The thigh cells 25 are housed in single file in an upholstered container which rides on top of the seat cushion 19. Nylon fastener strips (not shown) on the seat cushion upholstery, as well as on the underside of the thigh panel container, permit the thigh panels to be located at variable distances from the center of the seat cushion, or, if desired, removed entirely from the seat.

A lap belt strap 27 capable of extension or contraction, is connected, via cable 29, through a guide tube 31, to a lap belt-actuating mechanism which may be located beneath the seat frame 17. A similar strap and cable arrangement exists to the right of the seat permitting both ends of the lap belt to be simultaneously extended or contracted about the ventral area of a seated subject. Seat 10 is also equipped with a standard shoulder harness 32. Although this harness is not actively driven, there is some coupling of the lap belt drive into the shoulder harness because the lap belt buckle also serves as a terminus for the shoulder straps.

As more fully described in the aforementioned Cardullo et al patent application, the air cells and lap belt of the Advanced G-Seat are individually, pneumatically driven in response to computer control signals. The computer determines desired cell pressure in accordance with a model which receives acceleration data input and converts this to a compliment of signals which control air cell excursion and belt-harness tension so as to produce compatible skeletal attitude shifts, flesh pressure gradient variations and changes in area of flesh contact.

According to the instant invention, the capabilities of the above-described Advanced G-Seat to generate compatible motion cues, are significantly extended by the addition of means for independently varying skin tension in those epidermal areas proximate the cushions of said seat.

Pursuant to the present invention, desired skin tension cues are generated by controllably displacing at least a portion of a body-supporting, seat cushion surface in a direction generally parallel to said surface. This displacement causes accompanying movement of the clothing contiguous to, and the section of skin adjacent to, said cushion surface portion. The movement of the skin section relative to the surrounding skin results in desired skin tensioning in the surrounding skin; while the clothing movement produces appropriate force variations in other clothes coupled areas of the flesh. Compatible variations in the extent of seat contact with such sensitive body areas as the back-of-the-knee can also be produced by the parallel cushion surface displacement scheme of the instant invention.

A first embodiment of the improved G seat of the instant invention is illustrated in FIG. 2. In this embodiment, a seat cushion is mounted for coplanar translation to generate desired skin tension cues.

Figure 2A:
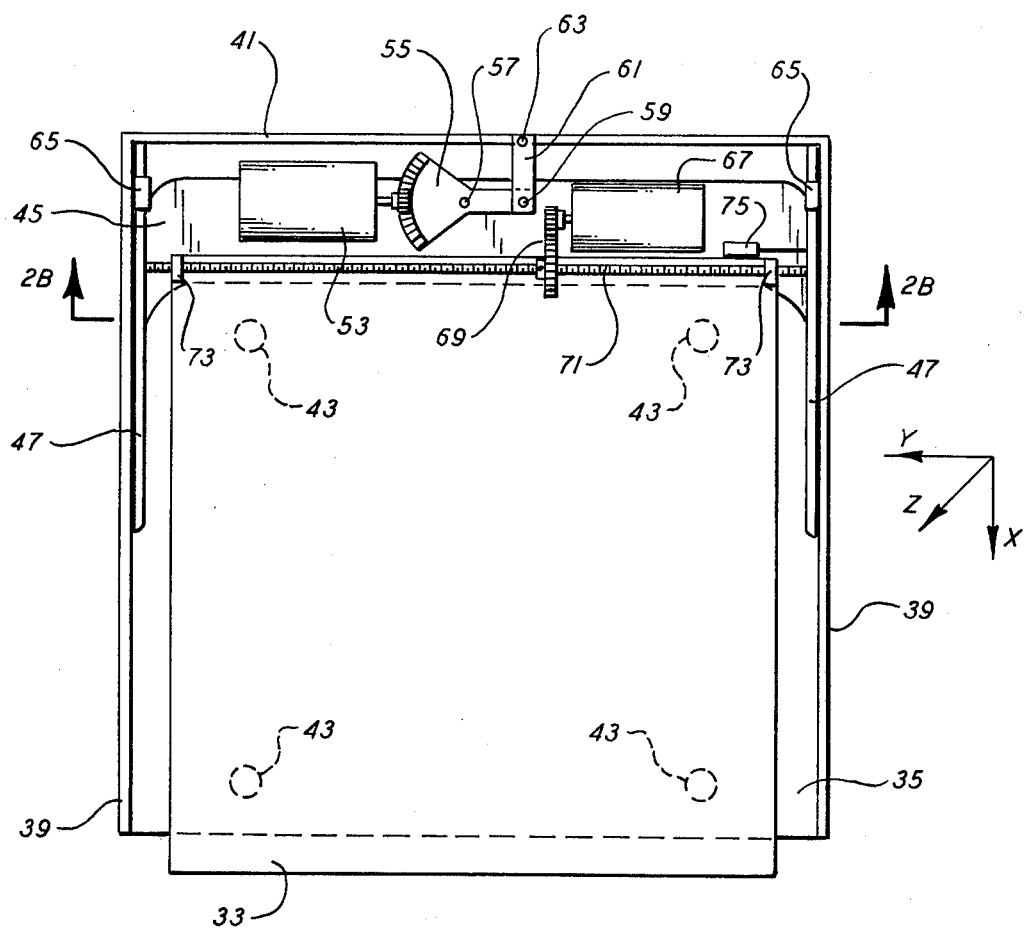
FIG. 2A is a top view of a moveable seat cushion embodiment of the instant invention.
Figure 2B:
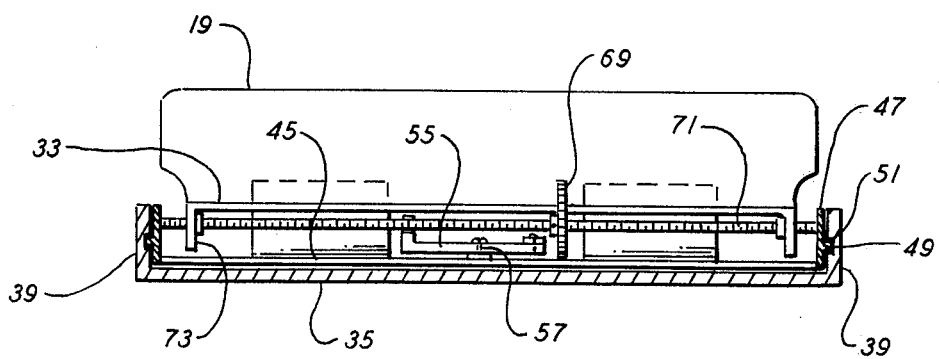
FIG. 2B is a sectional view taken along line 2B—2B in FIG. 2A.

A suitable mechanism for selectively displacing a seat pan 19, in either or both the X and Y directions, is shown in top view in FIG. 2A and cross sectional view in FIG. 2B. As FIG. 2A illustrates, cushion mobility is afforded by locating the lower surface 33 of cushion 19, on a travel bed 35 of the seat support frame. Travel bed 35 is bounded by a pair of vertically standing sidewalls 39, and a rear lip 41. Roller bearings 43 are sandwiched between cushion bottom surface 33 and travel bed 35 to facilitate movement therebetween.

Also mounted on travel bed 35, but at the rear of seat cushion 19, is an intermediate bed 45. This intermediate bed consists essentially of a narrow horizontal cross member bounded by forwardly extending sidewalls 47. As best seen in FIG. 2B, sidewalls 47 are provided with external guide rails 49 which fit into matching, longitudinally extending grooves 51 on the inner surface of the travel bed side walls 39. Intermediate bed 45 is designed for longitudinal translation relative to travel bed 35. The mated guide rails and grooves between the adjacent sidewalls constrain intermediate bed movement to the X direction.

As shown in FIG. 2A, intermediate bed 45 preferably supports the motors and gearing used to supply both longitudinal (X) and lateral (Y) motion to the seat cushion. Longitudinal displacement of intermediate bed 45 is produced by longitudinal torque motor 53 connected, with suitable gear reduction, to pivot gear 55. The pivot gear is rotatably pinned at 57 to intermediate bed 45, and at 59 to the forward end of a longitudinally extending arm 61. The aft end of arm 61 is rotatably secured at 63 to rear lip 41 of travel bed 35. When longitudinal torque motor 53 is energized, it causes pivot gear 55 to rotate about pin 57, thereby producing longitudinal displacement of intermediate bed 45. Since, as more fully explained below, the aft portion of seat cushion 19 is supported by intermediate bed 45, longitudinal translation of said bed results in a concomitant displacement of the seat cushion. Potentiometers, or other displacement sensors 65, can be mounted between the intermediate bed and travel bed to provide a position feedback signal to the longitudinal drive mechanism.

The lateral drive mechanism can also be mounted on intermediate bed 45. This drive mechanism includes a lateral torque motor 67 coupled through reduction gearing 69, to a worm gear 71. Worm gear 71 extends transversely between the side walls 47 of the intermediate bed. The ends of the worm gear are journaled into holes (not shown) in these side walls, so that it can rotate freely. Downwardly extending, apertured collars 73, provided at the rear corners of surface 33, connect seat cushion 19 to worm gear 71. Worm gear 71 is threaded through the apertured collars so that rotation of this gear by motor 67 causes linear translation of seat pan 19 along the Y direction. A potentiometer, or other displacement sensor 75, can be mounted between cushion 19 and intermediate bed 35 to provide position feedback to the closed loop electric torque motor 67.

The bi-directionally driveable torque motors 53 and 67 are preferably controlled by a computer drive system (not shown) which directs coplanar seat pan movement in response to simulated lateral and longitudinal, translational and rotational accelerations as produced by a solution of the equations of motion for the aircraft being simulated. Typically, the seat pan is driven a scaled distance forward for thrust maneuvers and rearward for braking maneuvers, by longitudinal torque motor 53. Similarly, the seat pan is made to move a scaled distance leftward for leftward vehicular acceleration and rightward for rightward vehicular acceleration, by lateral torque motor 67. Composite acceleration profiles are simulated by combined lateral and longitudinal movement of the seat pan.

The thus scheduled coplanar movement of the seat pan, relative to the remainder of the seat, causes accompanying displacement of those areas of the outer skin layer of the buttocks and upper legs adjacent the seat pan, relative to the surrounding skin areas of the seatbelt restrained subject. This displacement produces skin tension sensations similar to those experienced during the actual vehicular acceleration being simulated.

A similar mechanism could, of course, be employed to selectively and independently translate the backrest in either or both the Y and Z directions.

Figure 3A:
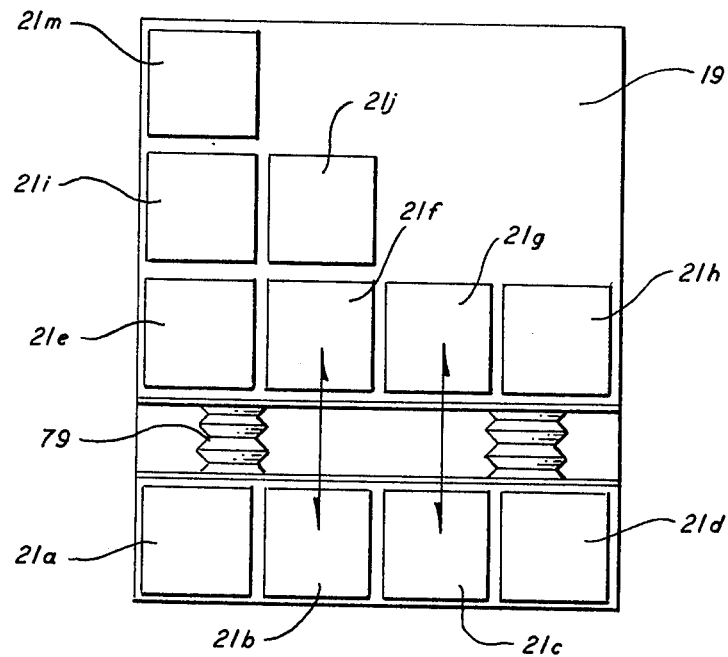
FIG. 3A is a top plan view of a segmented seat cushion embodiment of the instant invention.
Figure 3B:
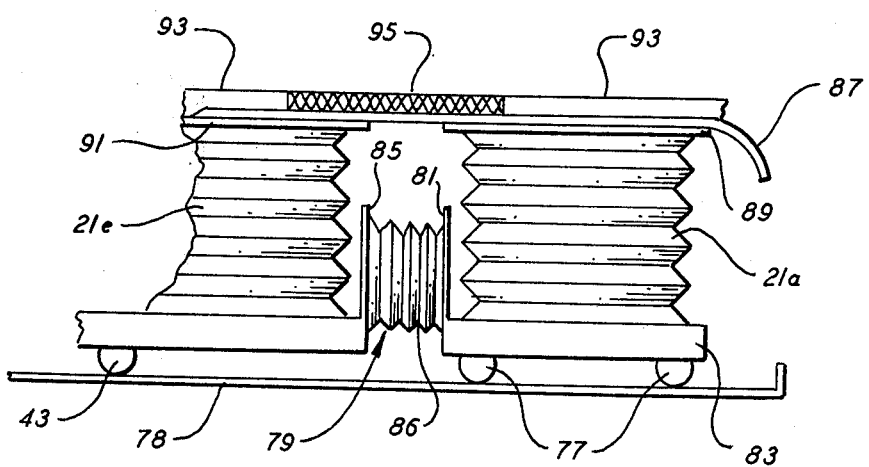
FIG. 3B is a partial side view of said segmented seat cushion.
Figure 3C:
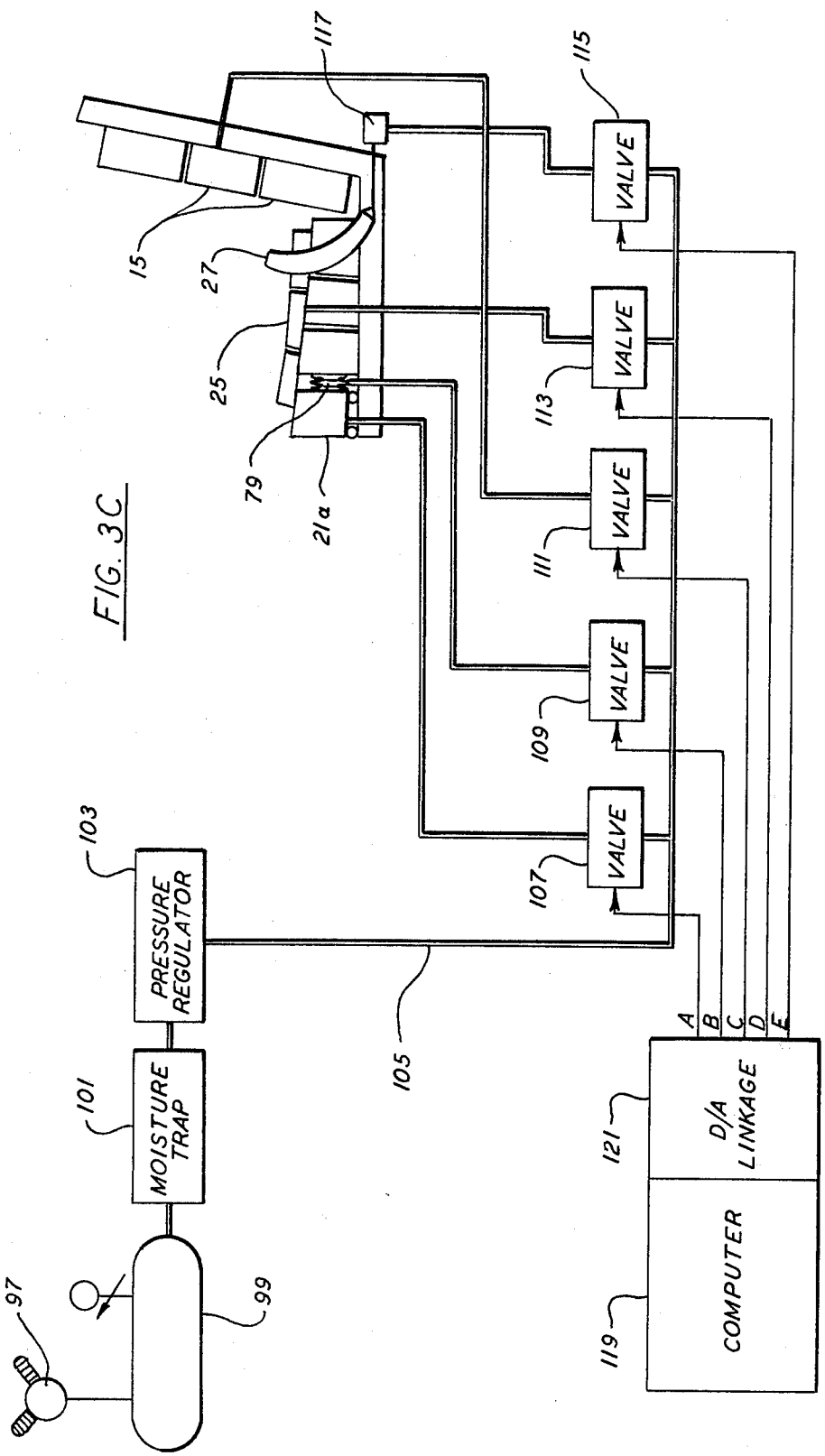
FIG. 3C is a drawing illustrating a preferred control system of the instant invention.

Instead of, or, in addition to, translation of a whole seat cushion, the G seat can be fabricated to permit coplanar movement of a section of a seat cushion relative to the remainder of the cushion. FIGS. 3A, 3B and 3C illustrate this favored method of eliciting compatible skin tension cues, as it could be applied to the seat pan of the Advanced G-Seat.

FIG. 3A is a top view of a seat cushion 19 segmented to permit longitudinal translation of the front row of air cells relative to the remainder of the seat cushion. Cells 21a–21d may be mounted for either individual or joint movement. Of course, numerous other segmented seat cushion configurations are possible.

FIG. 3B depicts in side view a preferred drive mechanism for an exemplary air cell 21a of the segmented seat pan of FIG. 3A. Air cell 21a is mounted on its own travel bearings 77 for bi-directional longitudinal movement on travel bed 78. The balance of the seatpan could, but need not be, mounted on travel bearings 43 for horizontal plane movement, as described above with respect to FIG. 2.

A small pneumatic bellows assembly 79 is preferably employed as the prime mover for air cell 21a. This bellows assembly consists of a forward end plate 81 rigidly secured to the lower surface 83 of air cell 21a, a rear end plate 85 rigidly secured to the lower surface of the rear portion of the seat cushion, and a bellows 86 attached between said end plates. Bellows assembly 79 is designed to longitudinally translate air cell 21a in response to selective variations in air pressure supplied through an intake hose (not shown).

A gap bridge plate 87 is fixedly secured to the top plate 89 of air cell 21a. This gap bridge plate extends rearwardly from the air cell 21a so that its aft end rests upon and slides with respect to top plate 91 of cell 21e. The gap bridge plate is used to prevent entrapment of the subject's flesh in the gap between the extendable segment and the balance of the cushion. Each cell of the extendable segment preferably has its own gap bridge plate overlying the top of the rearwardly adjacent cell. This preserves the present attitude, elevation and contour capabilities of the Advanced G-Seat cushions.

The segmented seat pan is covered with duck or some other reasonably non-skid material 93 everywhere, except over the gap bridge area, where an elasticized strip 95, parallel to the gap, is employed.

In operation, the front segment of the seat pan is made to move a scaled distance forward under thrust conditions and aft when braking, relative to the balance of the seat pan. The segment could typically be displaced within a range of ± ¾ inch. The accompanying generally parallel movement of the front section of the cushion surface not only produces the desired variations in flesh tension in the buttocks to back-of-knee region, but also provides compatible variations in extent of flesh/seat contact in the dorsal upper knee area.

As illustrated in FIG. 3C, seat segment extension is coordinated with the operation of the other active elements of the Advanced G-Seat through a common control system. A compressor 97 maintains a storage accumulator 99 at a desired pressure. The compressed air from accumulator 99 is passed through a moisture trap 101 and pressure regulator 103 and then over line 105 to servo pressure valves 107, 109, 111, 113, and 115. These valves may be, for example, Electro-Pneumatic Transducers Model T-25 manufactured by the Conoflow Corporation, a division of ITT Hammerdahl, in Providence, Rhode Island. Such valves will provide a pressure output which is directly proportional to the current input. On the figure, only five representative valves are shown; in the actual G-seat, one valve is provided for each air cell, one for each bellows assembly of the segment extender and one for the lap belt actuator. As illustrated, valve 107 provides pressurized air to seat cushion cell 21a, valve 109 provides pressurized air to bellows assembly 79, valve 111 provides pressurized air to backrest cell 15, valve 113 provides pressurized air to thigh panel cell 25 and valve 115 provides pressurized air to lap belt actuator 117.

The simulator computer 119 provides signals to the valves; these signals are designated A, B, C, D and E on the figure. Computer 119 may represent any digital or analog computer capable of generating control signals from acceleration input data in real time. In most applications, the computer which controls the total aircraft simulator will be used to operate the improved G-seat. As an example, a Systems Engineering Laboratories' Systems 86 computer could be used as the computational device. A D/A linkage, comprising a conventional digital-to-analog converter and smoothing filters, can be employed to convert the digital outputs from the digital computer to scaled analog signals.

In the illustrated embodiment, digital computer signals for each driven element are made available to the D/A linkage unit 121 which in turn issues control signals to the electro pneumatic transducers. The transducers respond to variations in the control signals with pressure variations altering excursion of each driven element. As the excursion of the driven elements change, the contouring, elevation, attitude and extent of the cushion surfaces change, thereby elliciting Haptic sensory system stimuli from the subject seated upon the improved G-seat. Overall cushion surface movement, lap belt operation and seat cushion segment extension are programmed to cause stimuli compatible with the existing simulated aircraft acceleration.

In place of the depicted pneumatic prime mover, a torque motor or other comparable drive system can be used to produce segment extension. Similarly, although depicted here for X axis acceleration use, segment extension could also be employed by appropriate cushion segmentation and drive axis selection, to respond to Y axis acceleration or, if used in the backrest, to respond to Y and/or Z axis acceleration.

As an alternative means for generating skin tension cues, a seat cushion can be provided with an accessory, generically termed a "seat cushion lip extender." Various forms of lip extenders are depicted in FIGS. 4, 5, 6 and 7.

Figure 4A:
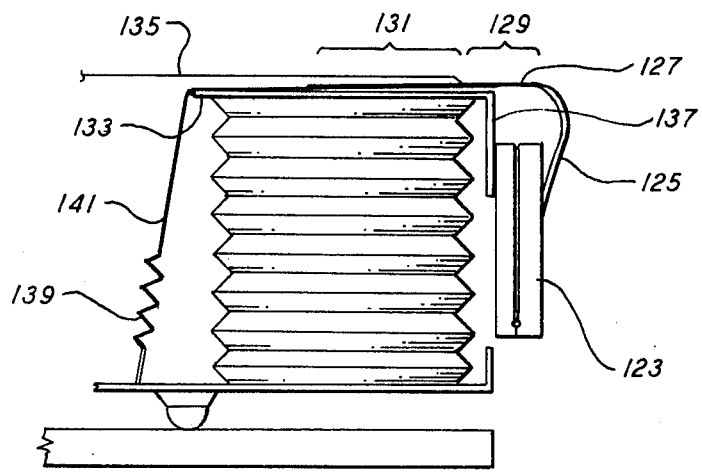
FIG. 4A is a side view of a first lip extender embodiment of the instant invention.

FIG. 4 depicts the seat pan of the Advanced G-Seat modified with a forward lip extender. As shown in side view in FIG. 4A, this forward lip extender includes a pneumatic actuator 123 having a metal panel 125, which defines the forward vertical face and lip of the seat cushion, secured thereto. Attached to panel 125 is a horizontally disposed thin flexible metal or celluloid strip 127. Front section 129 of this strip is exposed, while the rear portion 131 is sandwiched between the air cell top plate 133 and an upholstery covered top sheet 135. Top sheet 135 can, for example, be made of tempered metal, celluloid or heavily starched fabric.

Pneumatic actuator 123, which is rigidly secured to a downwardly extending flange 137 of air cell top plate 133, consists of a torsion spring loaded, clam-shell shaped air cell, generally similar to the thigh cell 25 depicted in FIG. 1. By varying the pressure of air supplied to actuator 123 through an input hose (not shown), the rounded top edge or lip of panel 125 can be made to move fore and aft according to a schedule of longitudinal accelerations.

Figure 4B:
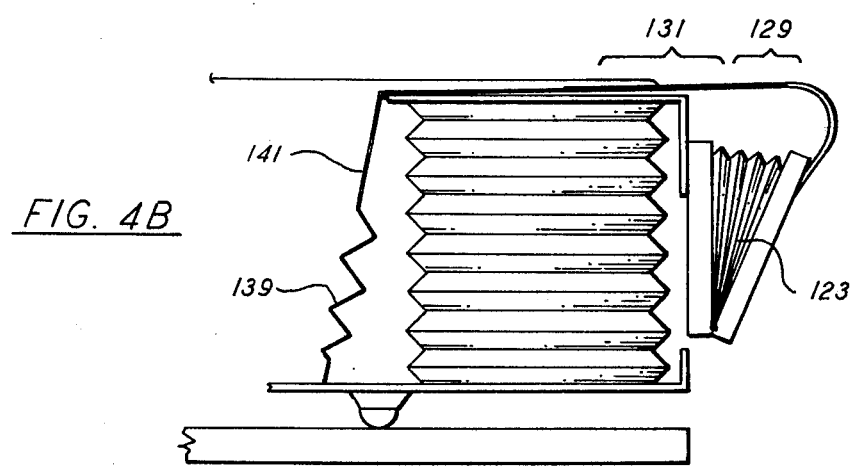
FIG. 4B is a side view of the lip extender of FIG. 4A under simulated thrust conditions.

As shown in FIG. 4B, forward lip movement under, for example, thrust conditions, unsheathes the rear portion of strip 127, thereby longitudinally extending the horizontal surface of the seat pan. This movement serves two purposes: it varies skin tension on the underside of the legs and increases the area of contact in the dorsal upper knee region. To these ends, the exposed portion 129, of the horizontal strip 127, is roughened to provide reasonable adhesion to the pants material; while portion 131 is coated with a friction-reducing film to permit smooth entry and exit from its sheath under the subject's body load.

As FIG. 4B illustrates, inflation of spring-loaded actuator 123 causes unsheathing of strip portion 131. Normally, this strip is made stiff enough so that deflation of the actuator will cause sheathing. Under certain circumstances, it may be desirable to employ a spring loaded ribbon assembly to aid sheathing. This optional assembly could include a retractor spring 139, having one of its ends affixed to the lower surface of the seat pan and the other end connected via a ribbon tie 141 to the aft end of strip 127.

Figure 4C:
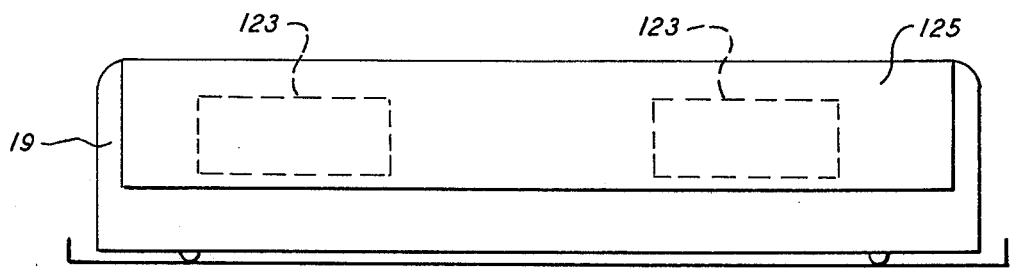
FIG. 4C is a front view of a seat pan equipped with the lip extender of FIG. 4A.

As shown in the front view of FIG. 4C, the lip formed by panel 125 can cover substantially the whole front top edge of seat pan 19. The displacement of this extendible lip by actuators 123 can be coordinated with the operation of the other active elements of the Advanced G Seat to provide compatible Haptic sensory cues to an occupant of said seat in a manner analagous to that shown in FIG. 3C.

A somewhat similar lip extender is portrayed in FIG. 5A. In this embodiment, a tempered steel strip 143 riveted at its lower extremity to top plate flange 137, serves as the extendible forward lip. The air cell top plate 133 is machined to have a horizontal slot 145 which acts as a sheath for the other end 147 of strip 143. An air activated bellows 149 is sandwiched between strip 143 and downward extension 137. Inflation of this bellows under, for example, simulated thrust conditions, unsheathes the horizontally disposed portion of strip 143 (see FIG. 5B). The spring rate of the tempered steel strip resheathes the extender upon bellows deflation. A noteworthy advantage of this embodiment is that lip extension can be conducted on an individual cell basis, as illustrated in FIG. 5C, such that no present elevation, attitude, or contouring capability of the Advanced G-Seat is lost.

FIG. 6 depicts an alternative form of lip extender employing a rotatable cam 151. Controlled cam rotation about pin 153, from the retracted position, shown in solid line, to the extended position, shown in phantom, generates appropriate skin tensioning cues.

A flexible bladder lip extender for a seat cushion is illustrated in FIG. 7. Clip 155 channels the expansion of air bladder 157 in the direction indicated by the arrow, so that the bladder assumes the contour illustrated in phantom when fully inflated.

The various views of FIG. 8 illustrate a driveable upholstery embodiment of the instant invention. In this embodiment, the intent is to pull or tug upon the seat's upholstery in a manner which will cause an exposed portion of it to move sideways. This movement will produce tension or contraction of the surface layer of flesh placed adjacent to the moveable upholstery portion.

Figure 8A:
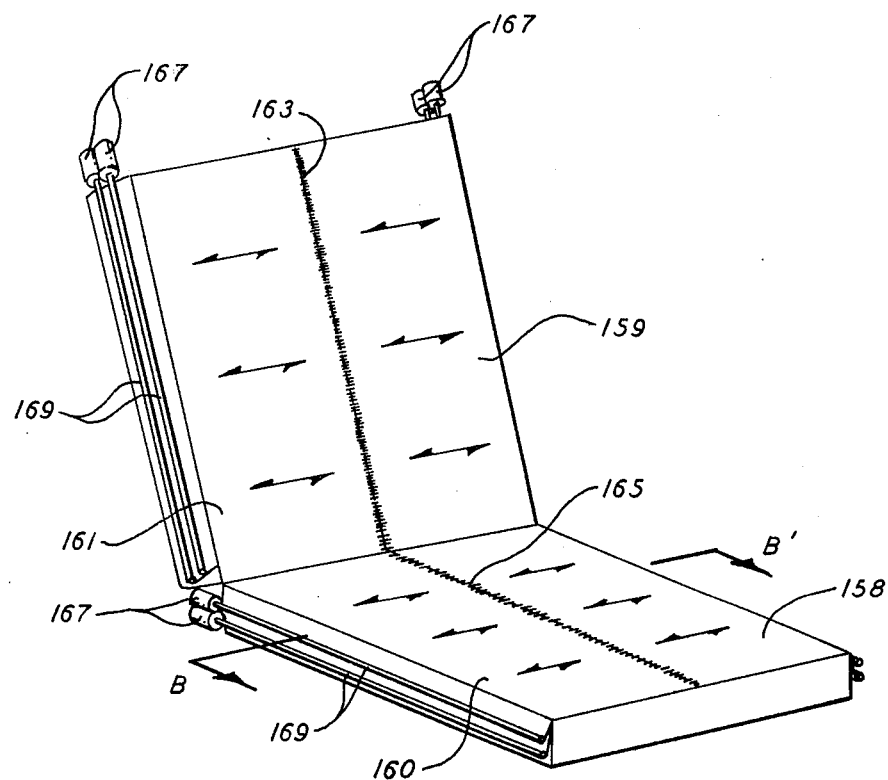
FIG. 8A is a perspective view of a seat employing driveable upholstery.

This approach to skin tension cue generation is illustrated in FIG. 8A in an arrangement for simulating vehicle lateral acceleration or roll effects. In order to increase or decrease skin tension, it is necessary to move one seat surface area exposed to the flesh, relative to another surface area similarly exposed. For this reason the seat surface in FIG. 8A is divided into four sections 158, 159, 160 and 161. Sections 158 and 159 are adjacent to a seated subject's left side, while sections 160 and 161 support the subject's right side. By holding the sections on one side fixed, the subject tends to remain relatively fixed in the seat. Then, by laterally moving the other sections, skin tension can be altered.

If, for example, a rightward lateral acceleration is to be simulated, the seat surface section supporting the subject's right buttocks and leg is laterally fixed, while the section adjacent his left buttocks and leg is simultaneously moved in a rightward direction. This movement brings the skin of the left buttocks closer to the right buttocks thereby increasing the tension in the flesh of the outer areas of the left buttocks and thigh. This movement also causes the flesh of the left leg to rotate counter clockwise, when viewed from aft of the subject, providing a further appropriate cue. Corresponding movement of the backrest surface sections results in similar skin tension variations in the upper torso. (It should be noted that the same effects could be accomplished with the segment extension approach of FIG. 3, if segments are defined which part the seat into two equal left and right parts.)

As shown in FIG. 8A, the seat surface sections of the backrest meet along interlace 163, while the surface sections of the seat pan intersect at interlace 165. Motors 167 and torque rods 169 are provided on both sides of the seat cushions to produce the desired relative movement between the left and right seat surface sections.

Figure 8B:
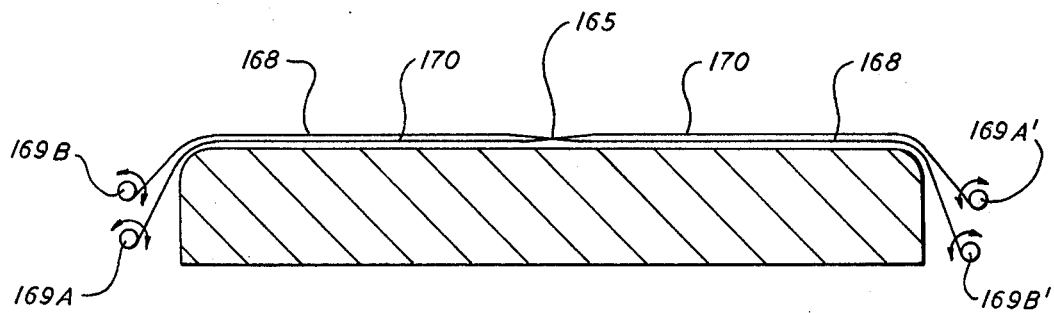
FIG. 8B is a sectional view taken along line B B' in FIG. 8A of a seat pan covered with driveable upholstery.

An upholstery arrangement which provides the required sectionalized seat cushion surface is shown in the seat pan sectional view of FIG. 8B. As observed from aft of the seat, a first piece of upholstery 168 extends transversely from a torque rod 169B, on the left side of the seat pan, across the top of the seat cushion to a torque rod 169B', on the right side of the cushion. The portion of this first piece of upholstery to the left of the interlace 165 is exposed, while the portion to the right of the interlace is covered by a second piece of upholstery 170. This second upholstery piece similarly extends from a torque rod 169A, on the left side of the seat cushion, across the top of the seat cushion to a torque rod 169A' on the right side. Upholstery piece 170 is exposed to the right of interlace 165 and covered to the left of this interlace.

Torque motors 167 are connected to simultaneously rotate the pair of torque rods attached to a particular piece of upholstery in the same direction. The rods connected to each piece of upholstery thus act in concert, much like tape supply and take-up reels. Coordinated rotation of rods 169A and 169A', for example, laterally translates the exposed portion of upholstery piece 170 relative to the exposed portion of upholstery piece 168.

Figure 8C:
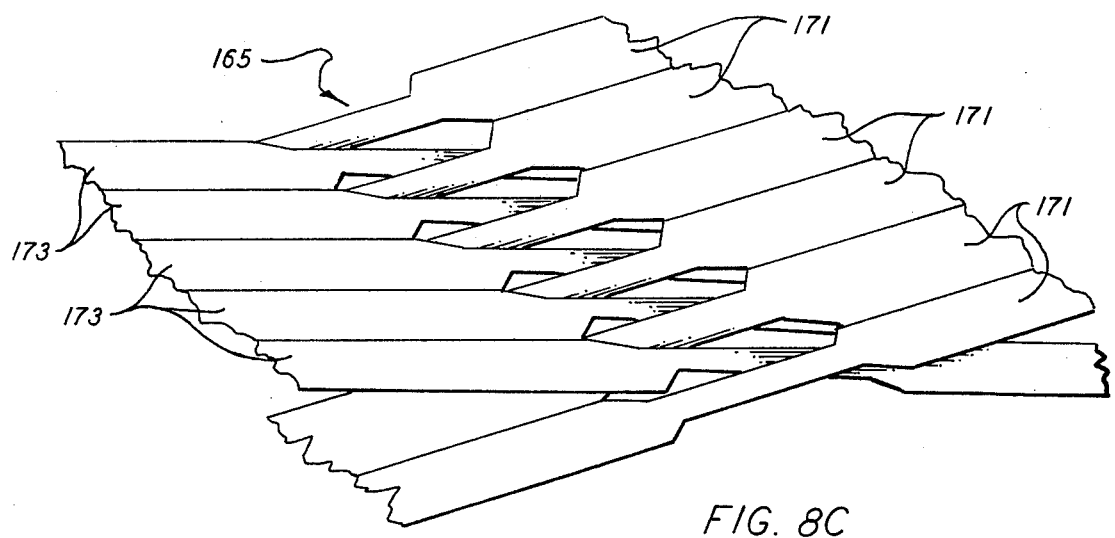
FIG. 8C is a drawing illustrating a driveable rush interlace.

A first form of driveable upholstery is presented in FIG. 8C. Criss-crossing tapes 171 and 173 in a rushed pattern provide the two required exposed seat surface areas and permit selective bi-directional drive. The interlace or criss-cross 165 occurs at a section of the tapes specifically narrowed. The exposed surface of each tape is preferably roughened to increase pants adhesion while the other surfaces of the tapes are coated with a friction-reducing film to facilitate tape movement.

Figure 8D:
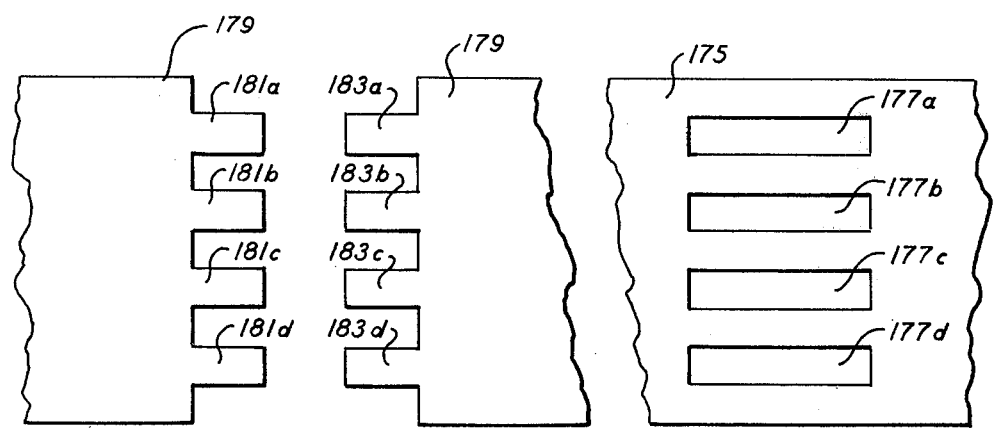
FIG. 8D is a drawing illustrating the components of an alternative form of driveable upholstery.

An alternate form of driveable upholstery, employing two solid sheets, can be constructed as illustrated in FIG. 8D. As shown, sheet 175 is provided with a series of slots 177a, 177b, etc. The other sheet 179 is divided in half and provided with corresponding tabs 181a, 181b, etc. and 183a, 183b, etc. The two halves of sheet 179 are located on opposite sides of sheet 175 and the tabs 181 and 183 are inserted in correspondingly lettered slots 177. The overlapping tabs are then cemented together to form the desired, interlaced and bi-directionally moveable upholstery.

When driveable upholstery is incorporated into an Advanced G-Seat, it covers a cushion composed of air cells scheduled to be driven to various elevations. In order to minimize interference between upholstery under tension and air cells in extension, it is desirable for the elevation of the torque rods to generally follow the average elevation of the row of air cells immediately adjacent to the rods.

Figure 8E:
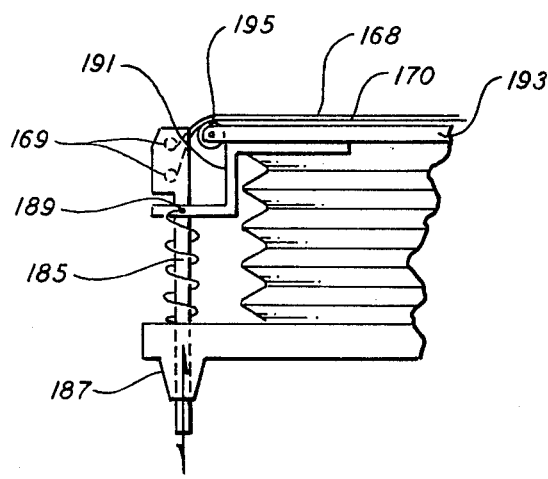
FIG. 8E is a partial front view depicting a torque rod support mechanism particularly useful when driveable upholstery is employed on an Advanced G-Seat.

A mechanism which permits the elevation of the torque rods at both seat front and rear to follow the activity of the adjacent air cell is depicted in FIG. 8E. As shown, torque rods 169 are supported by a compression spring-loaded plunger 185. The bottom portion of the plunger is located for vertical movement in a flanged aperture 187 of the cushion bottom surface. The plunger is also pinned at 189 to a follower tab 191, which is secured to air cell top plate 193. This mechanism permits the torque rods to follow the elevation of the adjacent air cell, while preventing the torque rods from rising, with respect to the air cell top plate, when torque, applied to the rods, pulls on the upholstery.

To further facilitate upholstery movement, the top surface of air cell top plate 193 can be coated with a thin friction reducing film. To the same end, freely rotatable roller pins 195 can be mounted along the edges of the top plate.

Although the driveable upholstery approach has been illustrated in an arrangement to simulate vehicle lateral acceleration or roll effects, it could also be applied to longitudinal or vertical acceleration simulation by appropriately changing the axis of upholstery movement. Further, this approach may be used on the moveable cushions of the Advanced G-Seat or other dynamic seat, or on standard passive cushions.

In each of the embodiments described above, the mechanism which generates skin tension cues in the epidermal areas proximate the seat cushions, also inherently produces the accompanying compatible alteration in clothes transferred force in other flesh areas.

In summary, the improved G-seat of the instant invention provides significant advantages over the prior art. It drives a Haptic sensory system element: skin tension, which was not directly addressed in earlier seat designs. It discerns the usefulness of flesh tension/contraction in a subject's analysis of body kinesthesis and recognizes the desirability of providing means to independently generate such cues in a vehicular motion simulator. Further, it suggests a unique approach and a variety of novel mechanisms for producing such controlled variations in flesh surface tension.

The instant invention permits realistic skin tension cues to be generated without relying on seat-external hardware or sacrificing cockpit fidelity. It is capable of providing compatible flesh surface tension cues and associated clothes transferred forces either alone or in concert with other Haptic sensory cues. It also allows the extent of flesh contact in the dorsal upper knee area to be selectively altered, thereby providing a further compatible motion cue. Moreover, in coordination with the other active elements of an Advanced G-Seat, it provides a set of reinforcing motion cues which simulate sustained accelerations with a degree of realism heretofore unattainable.

Although the invention has been described in connection with an Advanced G-Seat for an aircraft simulator, the principles involved can easily be applied to any body-supporting structure in any vehicle simulator. Likewise, the different mechanisms described for generating skin tension cues can be used either individually or in suitable combinations. Furthermore, it will be readily apparent to those skilled in the art that various modifications may be made to the described embodiments without departing from the scope of the invention as defined by the claims appended hereto.

What I claim is:

1. A method of simulating the motion of a vehicle, comprising:
   locating a subject on a body-supporting surface of a seat cushion, said seat cushion having a driveable component;
   driving said seat cushion component to produce skin tension variations in a selected portion of the subject's skin proximate said surface, similar to the variations experienced in said skin portion during actual operation of the vehicle being simulated, said component being driven according to a predetermined schedule correlating component movement with compatible skin tension variations in said selected skin portion and developing said predetermined schedule from simulated motion profiles to directly generate the compatible skin tension variations.

2. The method of claim 1 wherein said driveable component comprises a portion of said body-supporting surface of said seat cushion and said driving step comprises:
   controllably displacing said surface portion relative to the remainder of said surface in a direction generally parallel to said surface.

3. The method of claim 1 wherein the subject is located on said seat cushion such that a skin area, adjacent said selected skin portion, is supported by said driveable seat component; and
   wherein said driving step includes the steps of: generating a drive signal representative of desired skin tension in said selected skin portion, and applying said signal to the driveable seat component.

4. In a method of simulating vehicular motion, the cue generating process comprising the steps of:
   positioning a subject in a seat so that the subject is supported by a seat cushion surface;
   displacing a first portion of said seat cushion surface relative to the remainder of the surface in a direction generally parallel to said surface; and
   controlling the specific direction and extent of said displacement such that a compatible motion cue is provided to said subject.

5. In a seat for simulating the flight of an aircraft, wherein means for varying the skeletal attitude of an occupant of said seat are employed to generate body excursion cues similar to those experienced during said flight, the improvement comprising:
   first seat cushion means for independently providing skin tension cues to said occupant; and
   second means designed to develop control signals representative of skin tension cues experienced during said flight, said signals being provided to and controlling the operation of said first means, whereby said occupant is exposed to compatible skin tension cues as well as compatible body excursion cues, and thus the flight is simulated with greater realism.

6. Apparatus for simulating vehicular motion, comprising:
   a seat cushion for supporting a subject;
   first displaceable means associated with said seat cushion and operable to vary skin tension in a selected area of the subject's epidermis adjacent said seat cushion; and
   second means for controlling the operation of said first means according to a predetermined schedule which directly correlates displacement of said first means with compatible skin tension variations in said selected epidermal area, whereby skin tension variations comparable to those encountered in an operational vehicle are produced.

7. A seat for use in simulating vehicular motion comprising:
   a seat frame;
   a seat cushion supported by said frame, said seat cushion having a body-supporting surface;
   first means for displacing at least a portion of said surface relative to said frame, in a direction generally parallel to said surface; and
   second means for controlling said first means so that the surface displacement produced by said first means directly provides a compatible motion cue to an occupant of said seat said compatible motion cue comprising a variation of skin tension in a selected epidermal area.

8. The seat of claim 7 wherein said compatible motion cue further includes a force variation in another epidermal area which is clothes-coupled to said seat cushion surface.

9. The seat of claim 7 wherein the compatible motion cue further comprises a variation in extent of seat contact with the back of the occupant's knees.

10. The seat of claim 7 wherein said seat cushion includes a plurality of air cells having rigid top plates.

11. The seat of claim 7 wherein said first means includes means for imparting coplanar movement to the whole seat cushion.

12. The seat of claim 11 wherein said seat cushion comprises a seat pan and said first means comprises means for displacing said seat pan laterally and longitudinally.

13. The seat of claim 12 further including an intermediate bed mounted on said travel bed and connected to the rear of the seat cushion, said intermediate bed supporting means for imparting movement to said seat cushion in two orthogonal directions.

14. The seat of claim 11 wherein said frame includes a travel bed and further including bearings sandwiched between said travel bed and said seat cushion to permit movement of said seat cushion on the travel bed.

15. The seat of claim 7 wherein said first means comprises means for displacing a first portion of said body-supporting surface relative to the remainder of said surface in a direction generally parallel to said surface.

16. The seat of claim 15 wherein said first means includes means for imparting coplanar movement to a segment of said seat cushion relative to the remainder of the seat cushion.

17. The seat of claim 16 wherein said seat cushion comprises a seat pan, said segment is the forward section of the seat pan and said means for imparting coplanar movement comprises a pneumatic bellows assembly.

18. The seat of claim 17 wherein said seat pan comprises a plurality of inflatable air cells having rigid top plates, said segment contains at least one of said air cells, and further including a gap bridge plate fixedly secured to the top plate of said one air cell and extending rearwardly so that it overlies and slides with respect to the top plate of a rearwardly adjacent air cell.

19. The seat of claim 15 further including an elasticized strip connecting said first surface portion to the remainder of said surface.

20. The seat of claim 15 wherein said first surface portion is connected to a seat cushion lip and said first means comprises a seat cushion lip extender.

21. The seat of claim 20 wherein said lip extender comprises pneumatic actuator means.

22. The seat of claim 20 wherein said seat cushion lip extender comprises a rotatable cam.

23. The seat of claim 20 wherein said seat cushion lip extender comprises an inflatable bladder.

24. The seat of claim 15 wherein said first surface portion comprises a driveable piece of upholstery.

25. The seat of claim 24 wherein said body-supporting seat surface comprises interlaced upholstery pieces, the ends of said upholstery pieces being attached to bi-directionally rotatable torque rods.

26. The seat of claim 25 wherein said seat cushion includes an air cell having a rigid top plate and further including means for maintaining at least one of said torque rods in a predetermined spatial relationship with respect to the top plate of said air cell.

27. In a dynamic seat of the type employed to simulate vehicular motion, the improvement comprising:
first means designed to provide skin tension cues to an occupant of said seat without altering the skeletal attitude of said occupant or applying pressure to the occupant's skin; and
second means for controlling said first means in such a way that the skin tension cues provided to said occupant are similar to those experienced in an operational vehicle.

28. In a seat for simulating vehicular motion by providing motion cues to a seated subject, the improvement comprising:
first means for controllably varying the extent of seat contact in a subject's dorsal upper knee area without moving the subject relative to said seat to provide skin tension cues to said subject's knee area; and
second means for driving said first means so that the variations in extent of seat contact produced by said first means are comparable to those experienced while operating an actual vehicle.

29. Apparatus for simulating vehicular motion comprising:
a dynamic for providing simultaneously, independently variable haptic sensory system cues, said cues including the skeletal attitude, extent of seat contact, flesh pressure gradient and flesh surface tension of an occupant; and
means for controlling the operation of said seat so that it provides compatible haptic sensory system cues to said occupant.

* * * * *

UNITED STATES PATENT AND TRADEMARK OFFICE
CERTIFICATE OF CORRECTION

PATENT NO. : 4,030,207
DATED : June 21, 1977
INVENTOR(S) : Gerald J. Kron

It is certified that error appears in the above-identified patent and that said Letters Patent are hereby corrected as shown below:

Col. 1, line 53, "on" should be --an--.

Col. 14, line 45 (Claim 29) insert --seat-- after "dynamic".

Signed and Sealed this

Fourth Day of October 1977

[SEAL]

Attest:

RUTH C. MASON
*Attesting Officer*

LUTRELLE F. PARKER
*Acting Commissioner of Patents and Trademarks*